(12) United States Patent
Kawamura et al.

(10) Patent No.: US 9,170,476 B2
(45) Date of Patent: Oct. 27, 2015

(54) PROJECTOR

(71) Applicant: SEIKO EPSON CORPORATION, Tokyo (JP)

(72) Inventors: Masakazu Kawamura, Matsumoto (JP); Kanji Yoshida, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 216 days.

(21) Appl. No.: 14/068,643

(22) Filed: Oct. 31, 2013

(65) Prior Publication Data

US 2014/0146291 A1    May 29, 2014

(30) Foreign Application Priority Data

Nov. 29, 2012  (JP) ................. 2012-260961

(51) Int. Cl.
  *G03B 21/20*  (2006.01)
  *H04N 9/31*  (2006.01)
  *G03B 33/12*  (2006.01)

(52) U.S. Cl.
  CPC ............ *G03B 21/204* (2013.01); *G03B 21/208* (2013.01); *G03B 33/12* (2013.01); *H04N 9/3152* (2013.01); *G03B 21/2053* (2013.01); *G03B 21/2073* (2013.01); *H04N 9/3164* (2013.01)

(58) Field of Classification Search
  CPC .. G03B 21/204; G03B 21/20; G03B 21/2053; G03B 21/206; G03B 21/208; G03B 33/12; H04N 9/3152; H04N 9/315; H04N 9/3161; H04N 9/3164

USPC ............ 353/88, 89, 97, 94; 362/355; 359/227
See application file for complete search history.

(56) References Cited

U.S. PATENT DOCUMENTS

| 5,743,612 A | 4/1998 | Matsuda et al. |
| 2005/0007554 A1* | 1/2005 | Lee .................................. 353/20 |
| 2007/0046898 A1 | 3/2007 | Conner |
| 2011/0228232 A1* | 9/2011 | Sakata et al. .................... 353/31 |
| 2012/0051044 A1* | 3/2012 | Akiyama ...................... 362/233 |

FOREIGN PATENT DOCUMENTS

| JP | A-9-133974 | 5/1997 |
| JP | A-2004-361856 | 12/2004 |
| JP | A-2007-78815 | 3/2007 |
| JP | A-2007-206549 | 8/2007 |
| JP | A-2009-506384 | 2/2009 |
| WO | WO 2007/027676 A2 | 3/2007 |

* cited by examiner

*Primary Examiner* — William C Dowling
*Assistant Examiner* — Ryan Howard
(74) *Attorney, Agent, or Firm* — Oliff PLC

(57) ABSTRACT

A projector includes a solid-state light source, a diffuser member, an excitation light source, a phosphor, a light modulator, a projection system, a first and a second light blocking members. When the area, viewed in the direction of the optical axis of diffused light, of an opening of the first light blocking member and the area of a portion over which the first light blocking member blocks the diffused light are defined as A1 and A2, respectively; the area, viewed in the direction of the optical axis of fluorescence, of an opening of the second light blocking member and the area of a portion over which the second light blocking member blocks the fluorescence are defined as B1 and B2, respectively, the ratio A2/A1 is greater than the ratio B2/B1.

7 Claims, 8 Drawing Sheets

PROJECTOR

BACKGROUND

1. Technical Field

The present invention relates to a projector.

2. Related Art

There is a known configuration having a diaphragm provided in an illumination system for improvement in contrast. For example, in the projector described in JP-A-2004-361856, a diaphragm is disposed on the light incident side of a light valve and blocks obliquely incident light that lowers the contrast. To display a full-color image, a diaphragm may be provided for each of three light valves for RGB light fluxes.

In a three-panel projector, light outputted from a white light source is divided into three color light fluxes or RGB light fluxes, which are then guided to three light valves for the RGB light fluxes. When a diaphragm is disposed on the light incident side of each of the light valves, it is preferable that the sizes of the diaphragms are set to be equal to one another so that the white balance does not deteriorate.

On the other hand, a projector using a combination of a solid-state light source and a phosphor has been developed in recent years. As a projector of this type, there is a known projector including a first light source unit that is a combination of a solid-state light source and a phosphor and a second light source unit that is a combination of a solid-state light source and a diffusion member. For example, the first light source unit produces R and G light fluxes, and the second light source unit produces a B light flux. Then, thus produced light fluxes are separated from each other and guided to three light valves for the RGB light fluxes.

In a projector of this type as well, diaphragms can be used to improve contrast. However, the present inventor has conducted a study and found that setting the sizes of the RGB diaphragms to be equal to one another as in a typical three-panel projector undesirably results in a bluish displayed image and the white balance greatly deteriorates.

SUMMARY

An advantage of some aspects of the invention is to provide a projector capable of maintaining the white balance of a projected image.

(1) A projector according to an aspect of the invention includes a solid-state light source, a diffuser member that diffuses light outputted from the solid-state light source and outputs the diffused light, an excitation light source, a phosphor that is excited by light outputted from the excitation light source and emits fluorescence, a light modulator that modulates the diffused light outputted from the diffuser member and the fluorescence emitted from the phosphor in accordance with image information, a projection system that projects the light modulated by the light modulator as a projected image, a first light blocking member that is disposed in an optical path between the diffuser member and the light modulator and has an opening formed around the optical axis of the diffused light, and a second light blocking member that is disposed in an optical path between the phosphor and the light modulator and has an opening formed around the optical axis of the fluorescence. When the area of the opening of the first light blocking member viewed in the direction of the optical axis of the diffused light is defined as a first opening area $A1$; the area, viewed in the direction of the optical axis of the diffused light, of a portion over which the first light blocking member blocks the diffused light is defined as a first light blocking area $A2$; the area of the opening of the second light blocking member viewed in the direction of the optical axis of the fluorescence is defined as a second opening area $B1$; and the area, viewed in the direction of the optical axis of the fluorescence, of a portion over which the second light blocking member blocks the fluorescence is defined as a second light blocking area $B2$, the ratio $A2/A1$ of the first light blocking area $A2$ to the first opening area $A1$ is greater than the ratio $B2/B1$ of the second light blocking area $B2$ to the second opening area $B1$.

A conceivable reason for the problem described above that occurs in a projector using two light source units is as follows. In the light source unit using a solid-state light source and a diffuser member, the diffuser member diffuses light, but high directivity of the light from the solid-state light source cannot be completely eliminated and light having a certain high degree of directivity is outputted. On the other hand, in the light source unit using a solid-state light source and a phosphor, since the phosphor isotropically emits light in every direction, the emitted light has almost no directivity. As a result, when diaphragms used to block part of the light fluxes described above are of the same type, the light having higher directivity passes through the corresponding diaphragm by a greater amount and provides a brighter displayed image accordingly.

Under the circumstances, the projector according to the aspect of the invention includes a larger diaphragm in the optical path of the light having higher directivity (diffused light outputted from diffuser member) and a smaller diaphragm in the optical path of the light having lower directivity (fluorescence emitted from phosphor) for a well-balanced amount of light fluxes passing through the diaphragms. The configuration described above allows a skirt portion of the optical intensity distribution of the diffused light (portion where optical intensity is low) to be blocked by a greater amount than a skirt portion of the optical intensity distribution of the fluorescence (portion where optical intensity is low). Setting the ratio $A2/A1$ of the first light blocking area $A2$ to the first opening area $A1$ or the ratio $B2/B1$ of the second light blocking area $B2$ to the second opening area $B1$ at a predetermined value therefore allows the amount of diffused light and the amount of fluorescence incident on the light modulator to be equal to each other. The white balance of a projected image can thus be maintained.

(2) In the projector described in the above (1), the first light blocking member may be so configured that the ratio $A2/A1$ is adjustable in correspondence with the optical intensity distribution of the light outputted from the solid-state light source.

The configuration described above allows the amount of diffused light incident on the light modulator to be adjusted to a predetermined value even when the optical intensity distribution of the diffused light has a broad or narrow skirt portion (portion where optical intensity is low). The amount of diffused light and the amount of fluorescence incident on the light modulator can therefore be readily made equal to each other.

(3) In the projector described in the above (1) or (2), the second light blocking member may be so configured that the ratio $B2/B1$ is adjustable in correspondence with the optical intensity distribution of the light outputted from the excitation light source.

The configuration described above allows the amount of fluorescence incident on the light modulator to be adjusted to a predetermined value even when the optical intensity distribution of the fluorescence has a broad or narrow skirt portion (portion where optical intensity is low). The amount of diffused light and the amount of fluorescence incident on the light modulator can therefore be readily made equal to each other.

(4) In the projector described in any one of the above (1) to (3), the first light blocking member may be so configured that the ratio A2/A1 is adjustable in correspondence with the luminance or contrast of the projected image projected through the projection system.

The configuration described above allows the amount of diffused light incident on the light modulator to be adjusted as appropriate in accordance, for example, with a purpose of increasing the luminance or contrast of a projected image. The luminance or contrast of the projected image can therefore be readily increased.

(5) In the projector described in any one of the above (1) to (4), the second light blocking member may be so configured that the ratio B2/B1 is adjustable in correspondence with the luminance or contrast of the projected image projected through the projection system.

The configuration described above allows the amount of fluorescence incident on the light modulator to be adjusted as appropriate in accordance, for example, with a purpose of increasing the luminance or contrast of a projected image. The luminance or contrast of the projected image can therefore be readily increased.

(6) In the projector described in any one of the above (1) to (5), a first collimation system that parallelizes the diffused light outputted from the diffuser member, a pair of first lens arrays that homogenizes the luminance distribution of the light outputted from the first collimation system, and a first polarization conversion element that aligns the polarization states of the light outputted from the pair of first lens arrays may be disposed in the optical path between the diffuser member and the light modulator, and the first light blocking member may be disposed in the optical path between the pair of first lens arrays or in the optical path between the pair of first lens arrays and the first polarization conversion element.

The optical intensity distribution of the diffused light varies depending on the position in the optical path between the diffuser member and the light modulator.

If the first light blocking member is disposed in the optical path between the first polarization conversion element and the light modulator, the optical intensity distribution of the diffused light at the first light blocking member may greatly differ from an initial distribution in some cases. In this case, it is difficult to effectively block the diffused light.

In contrast, when the first light blocking member is disposed in the optical path between the pair of first lens arrays or in the optical path between the pair of first lens arrays and the first polarization conversion element, the position where the first light blocking member is disposed is closer to the diffuser member than in the configuration in which the first light blocking member is disposed in the optical path between the first polarization conversion element and the light modulator. As a result, the difference between the optical intensity distribution of the diffused light at the first light blocking member and the initial distribution can be reduced.

According to the configuration described above, the diffused light is therefore readily and effectively blocked.

(7) In the projector described in any one of the above (1) to (6), a second collimation system that parallelizes the fluorescence emitted from the phosphor, a pair of second lens arrays that homogenizes the luminance distribution of the light outputted from the second collimation system, and a second polarization conversion element that aligns the polarization states of the light outputted from the pair of second lens arrays may be disposed in the optical path between the phosphor and the light modulator, and the second light blocking member may be disposed in the optical path between the pair of second lens arrays or in the optical path between the pair of second lens arrays and the second polarization conversion element.

The optical intensity distribution of the fluorescence varies depending on the position in the optical path between the phosphor and the light modulator.

If the second light blocking member is disposed in the optical path between the second polarization conversion element and the light modulator, the optical intensity distribution of the fluorescence at the second light blocking member may greatly differ from an initial distribution in some cases. In this case, it is difficult to effectively block the fluorescence.

In contrast, when the second light blocking member is disposed in the optical path between the pair of second lens arrays or in the optical path between the pair of second lens arrays and the second polarization conversion element, the position where the second light blocking member is disposed is closer to the phosphor than in the configuration in which the second light blocking member is disposed in the optical path between the second polarization conversion element and the light modulator. As a result, the difference between the optical intensity distribution of the fluorescence at the second light blocking member and the initial distribution can be reduced.

According to the configuration described above, the fluorescence is therefore readily and effectively blocked.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
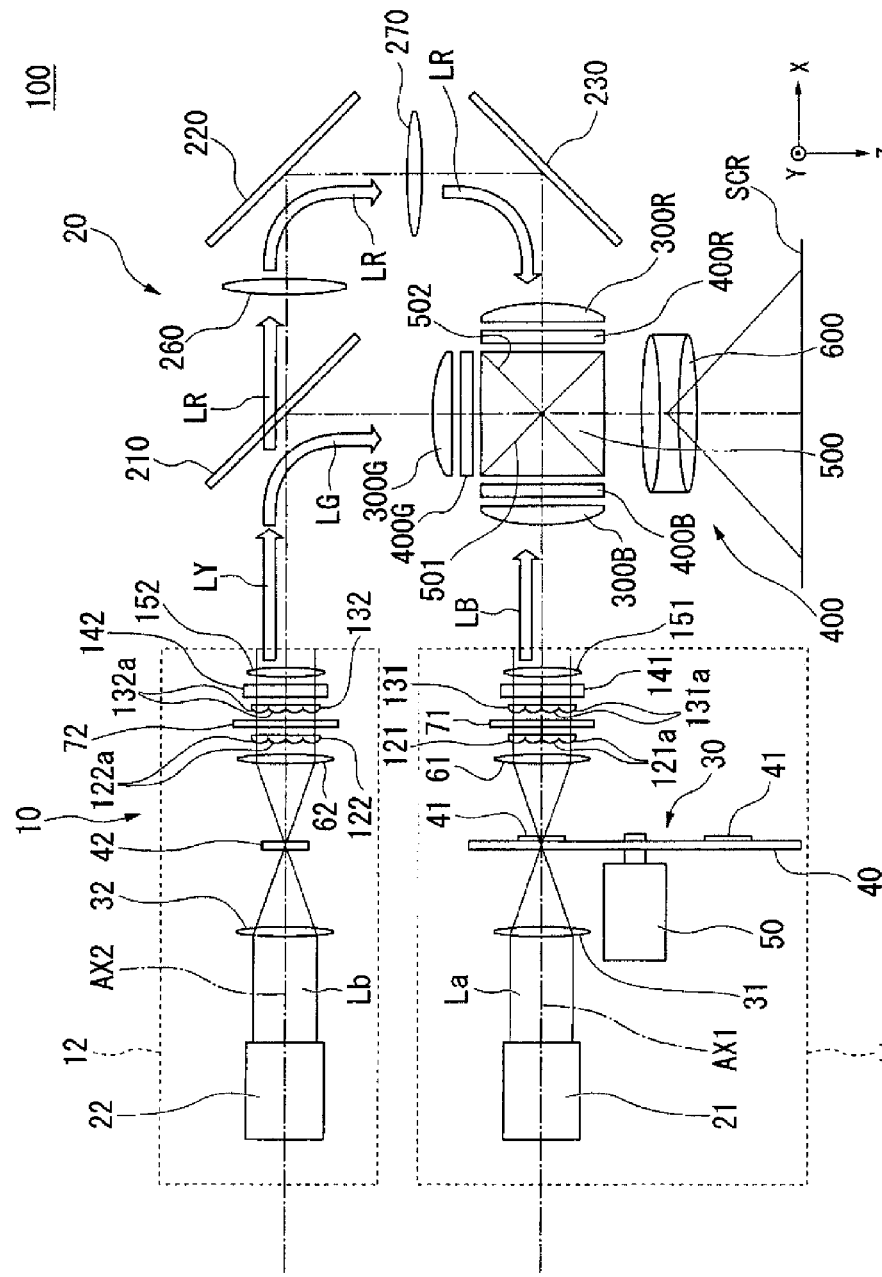
FIG. 1 shows a schematic configuration of a projector according to an embodiment of the invention.

An embodiment of the invention will be described below with reference to FIGS. 1 to 14.

In the present embodiment, a projector 100 will be described with reference to a projection-type projector that projects color light containing image information produced by a light modulator through a projection system on a screen (projection surface).

In the following description, an XYZ orthogonal coordinate system is set as required, and the positional relationship among members of the projector will be described with reference to the XYZ orthogonal coordinate system. In the present embodiment, the X direction is a direction parallel to the optical axis of light outputted from a light source unit 10, and the Y and Z directions are two directions perpendicular to the X direction.

The optical axis of the light outputted from the light source unit 10 represents an optical axis AX1 of light outputted from a first light source section 11 (solid-state light source 21) and an optical axis AX2 of light outputted from a second light source section 12 (excitation light source 22).

The optical axis AX1 corresponds to the "optical axis of diffused light" described in the appended claims. The optical axis AX2 corresponds to the "optical axis of fluorescence" described in the appended claims.

FIG. 1 is a schematic configuration diagram of the projector 100 according to the present embodiment.

The projector 100 according to the present embodiment includes the light source unit 10, a color separation/light guiding system 20, a light modulation unit 400, a cross dichroic prism 500, and a projection system 600, as shown in FIG. 1.

The light modulation unit 400 is formed of a liquid crystal light modulator 400R for red light, a liquid crystal light modulator 400G for green light, and a liquid crystal light modulator 400B for blue light, each of which works as a light modulator.

The light source unit 10 includes the first light source section 11 and the second light source section 12. The light source unit 10 outputs light containing red light, green light, and blue light. In the present embodiment, the first light source section 11 outputs blue light, and the second light source section 12 outputs yellow light containing red light and green light.

The first light source section 11 includes a solid-state light source 21, a collector lens 31, a diffuser member 41, a rotation mechanism 30, a first collimation system 61, a pair of first lens arrays (front lens array 121 and rear lens array 131), a first polarization conversion element 141, a superimposing lens 151, and a first light blocking member 71.

The solid-state light source 21 is a laser light source that outputs blue laser light La. The laser light La has a wavelength band of blue light. For example, the laser light La has a light emission intensity that peaks at 445 nm and has a wavelength band ranging from 430 to 450 nm.

The collimator lens 31 focuses the laser light La outputted from the solid-state light source 21 into a substantially single point and causes the resultant light to be incident on the diffuser member 41.

The rotation mechanism 30 includes a circular plate 40, which supports the diffuser member 41, and a motor 50, which rotates the circular plate 40. The circular plate 40 is made, for example, of silica glass, quartz, sapphire, optical glass, a transparent resin, or any other transparent material. The laser light La therefore passes through the circular plate 40.

The diffuser member 41 is continuously formed on the circular plate 40 along the rotation direction thereof and has a ring shape that includes a region on which the laser light La is incident. The diffuser member 41 appropriately diffuses the laser light La focused by the collector lens 31 and outputs the diffused light toward the first collimation system 61.

The circular plate 40 in use is driven by the motor 50 and rotated, for example, at 7500 rpm. An increase in temperature of the diffuser member 41 can thus be avoided.

The first collimation system 61 substantially parallelizes the diffused light outputted from the diffuser member 41.

The pair of first lens arrays 121 and 131 homogenizes the luminance distribution of the light outputted from the first collimation system 61.

The front lens array 121 has a plurality of lenslets 121a. The front lens array 121 divides the light outputted from the first collimation system 61 into a plurality of sub-light fluxes. Although not shown, the lenslets 121a are arranged in a matrix formed of a plurality of rows and columns in a plane perpendicular to the optical axis AX1. The outer shape of each of the lenslets 121a is substantially similar to the outer shape of an image formation region of the liquid crystal light modulator 4003 of the light modulation unit 400.

The rear lens array 131 has a plurality of lenslets 131a corresponding to the plurality of lenslets 121a of the front lens array 121. The rear lens array 131 along with the superimposing lens 151 forms an image of each of the lenslets 121a of the front lens array 121 in the vicinity of the image formation region of the liquid crystal light modulator 400B.

The first polarization conversion element 141 aligns the polarization directions of the divided sub-light fluxes from the front lens array 121 with each other and outputs the resultant linearly polarized light.

The superimposing lens 151 collects the sub-light fluxes outputted from the first polarization conversion element 141 and superimposes them on each other in the vicinity of the image formation region of the liquid crystal light modulator 400B.

The pair of first lens arrays 121, 131 and the superimposing lens 151 form an optical integration system that homogenizes the in-plane optical intensity distribution of blue light LB. The in-plane illuminance of the blue light LB is thus homogenized in the vicinity of the image formation region of the liquid crystal light modulator 400B.

The first light blocking member 71 is disposed in the optical path between the pair of first lens arrays 121 and 131. The first light blocking member 71 blocks part of the light outputted from the front lens array 121. The configuration of the first light blocking member 71 will be described later in detail.

The thus configured first light source section 11 outputs the blue light LB, which is a component of white light toward the liquid crystal light modulator 400B.

The second light source section 12 includes an excitation light source 22, a collector lens 32, a phosphor 42, a second collimation system 62, a pair of second lens arrays (front lens array 122 and rear lens array 132), a second polarization conversion element 142, a superimposing lens 152, and a second light blocking member 72.

The excitation light source 22 is a laser light source that outputs blue laser light Lb. The laser light Lb has a wavelength band of blue light. For example, the laser light Lb has a light emission intensity that peaks at 445 nm and has a wavelength band ranging from 430 to 450 nm.

The collector lens 32 focuses the laser light Lb outputted from the excitation light source 22 into a substantially single point and causes the resultant light to be incident on the phosphor 42.

The phosphor 42 is formed of a layer containing $(Y,Gd)_3(Al,Ga)_5O_{12}:Ce$, which is an (yttrium aluminum garnet)-based phosphor. The phosphor 42 converts the laser light Lb (blue light) outputted from the excitation light source 22 into light containing red light and green light. Specifically, the phosphor 42 is excited by the laser light Lb, which is excitation light having a wavelength of 445 nm, converts the laser light Lb into yellow light LY, which is fluorescence containing red light and green light, and emits the yellow light LY toward the second collimation system 62.

The second collimation system 62 substantially parallelizes the fluorescence emitted from the phosphor 42.

The pair of second lens arrays 122 and 132 homogenizes the luminance distribution of the light outputted from the second collimation system 62.

The front lens array 122 has a plurality of lenslets 122a. The front lens array 122 divides the light outputted from the second collimation system 62 into a plurality of sub-light fluxes. Although not shown, the lenslets 122a are arranged in a matrix formed of a plurality of rows and columns in a plane perpendicular to the optical axis AX2. The outer shape of each of the lenslets 122a is substantially similar to the outer shape of image formation region of each of the liquid crystal light modulators 400R and 400G of the light modulation unit 400.

The rear lens array 132 has a plurality of lenslets 132a corresponding to the plurality of lenslets 122a of the front lens array 122. The rear lens array 132 along with the superimposing lens 152 forms an image of each of the lenslets 122a of the front lens array 122 in the vicinity of the image formation region of each of the liquid crystal light modulators 400R and 400G.

The second polarization conversion element 142 aligns the polarization directions of the divided sub-light fluxes from the front lens array 122 with each other and outputs the resultant linearly polarized light.

The superimposing lens 152 collects the sub-light fluxes outputted from the second polarization conversion element 142 and superimposes them on each other in the vicinity of the image formation region of each of the liquid crystal light modulators 400R and 400G.

The pair of second lens arrays 122, 132 and the superimposing lens 152 form an optical integration system that homogenizes the in-plane optical intensity distribution of the yellow light LY. The in-plane illuminance of the yellow light LY is thus homogenized in the vicinity of the image formation region of each of the liquid crystal light modulators 400R and 400G.

The second light blocking member 72 is disposed in the optical path between the pair of second lens arrays 122 and 132. The second light blocking member 72 blocks part of the light outputted from the front lens array 122. The configuration of the second light blocking member 72 will be described later in detail.

The thus configured second light source section 12 outputs the yellow light LY, which is a component of white light, toward the color separation/light guiding system 20.

In the second light source section 12, the phosphor 42 and parts therearound may be so configured that a rotation mechanism is provided and rotatably supports a ring-shaped phosphor, as in the first light source section 11.

The color separation/light guiding system 20 separates the yellow light LY outputted from the second light source section 12 into green light LG and red light LR and guides the green light LG and the red light LR to the liquid crystal light modulator 400G and the liquid crystal light modulator 400R, which are illuminated with the green light LG and the red light LR, respectively.

The color separation/light guiding system 20 includes a dichroic mirror 210, reflection mirrors 220 and 230, and relay lenses 260 and 270. A field lens 300R is disposed in the optical path between the color separation/light guiding system 20 and the liquid crystal light modulator 400R. A field lens 300G is disposed in the optical path between the color separation/light guiding system 20 and the liquid crystal light modulator 400G. A field lens 300B is disposed in the optical path between the first light source section 11 and the liquid crystal light modulator 400B.

The dichroic mirror 210 is a mirror formed of a substrate on which a wavelength selective transmissive film that reflects light of a predetermined wavelength region and transmits light of the other wavelength region is formed. The dichroic mirror 210 reflects green light components and transmits red light components. Each of the reflection mirrors 220 and 230 is a mirror that reflects the red light components.

Among the components of the yellow light LY, the green light LG reflected off the dichroic mirror 210 passes through the field lens 300G and impinges on the image formation region of the liquid crystal light modulator 400G for green light.

Among the components of the yellow light LY, the red light LR having passed through the dichroic mirror 210 travels via the relay lens 260, the light-incident-side reflection mirror 220, the relay lens 270, and the light-exiting-side reflection mirror 230, passes through the field lens 300R, and impinges on the image formation region of the liquid crystal light modulator 400R for red light. The relay lenses 260, 270 and the reflection mirrors 220, 230 function as a relay system that guides the red light components having passed through the dichroic mirror 210 to the liquid crystal light modulator 400R.

On the other hand, the blue light LB outputted from the first light source section 11 does not pass through the color separation/light guiding system 20 but directly passes through the field lens 300B and impinges on the image formation region of the liquid crystal light modulator 400B for blue light.

The length of the optical path of the blue light LB may be adjusted in correspondence with the lengths of the optical paths of the green light LG and the red light LR. In this case, the adjustment may be made by using a relay system.

The liquid crystal light modulators 400R, 400G, and 400B modulate the color light fluxes incident thereon in accordance with image information to form a color image. Specifically, the liquid crystal light modulator 400B modulates the blue light LB outputted from the first light source section 11. The liquid crystal light modulator 400G modulates the green light LG, which is part of the yellow light LY outputted from the second light source section 12. The liquid crystal light modulator 400R modulates the red light LR, which is part of the yellow light LY outputted from the second light source section 12.

Although not shown, a light-incident-side polarizer is disposed between each of the field lenses 300R, 300G, 300B and the corresponding one of the liquid crystal light modulators 400R, 400G, 4003. Further, a light-exiting-side polarizer is disposed between each of the liquid crystal light modulators 400R, 400G, 400B and the cross-dichroic prism 500. The light-incident-side polarizers, the liquid crystal light modulators 400R, 400G, and 400B, and the light-exiting-side polarizers as a whole modulate the incident color light fluxes.

Each of the liquid crystal light modulators 400R, 400G, and 400B is a transmissive liquid crystal light modulator in which a pair of transparent glass substrates encapsulates and seals a liquid crystal material, which is an electro-optic substance. Each of the liquid crystal light modulators 400R, 400G, and 400B uses, for example, a polysilicon TFT as a switching device to modulate the polarization direction of one type of linearly polarized light outputted from the corresponding light-incident-side polarizer in accordance with a given image signal.

The cross dichroic prism 500 is an optical element that combines optical images obtained by modulating the color light fluxes outputted from the light-exiting-side polarizers to form a color image. The cross dichroic prism 500 is formed by bonding four rectangular prisms and thus has a substantially square shape in a plan view. A pair of dichroic films (first dichroic film 501 and second dichroic film 502), each of which is a dielectric multilayer film, is formed along the substantially X-shaped interfaces between the bonded rectangular prisms. The first dichroic film 501, which is formed on one of the substantially X-shaped interfaces, transmits the red light LR and the green light LG and reflects the blue light LB. The second dichroic film 502, which is formed on the other interface, transmits the green light LG and the blue light LB and reflects the red light LR. The dichroic films 501 and 502 deflect the red light LR and the blue light LB in such a way that the red light LR and the blue light LB travel in the same direction as the green light LG. The three color light fluxes are thus combined.

The color image outputted from the cross dichroic prism 500 is enlarged and projected through the projection system 600 and forms an image on a screen SCR.

A description will next be made of the relationship between the optical intensity distribution of the diffused light outputted from the diffuser member 41 in the first light source section 11 and the optical intensity distribution of the fluorescence emitted from the phosphor 42 in the second light source section 12 with reference to FIGS. 2 and 3.

Figure 2:
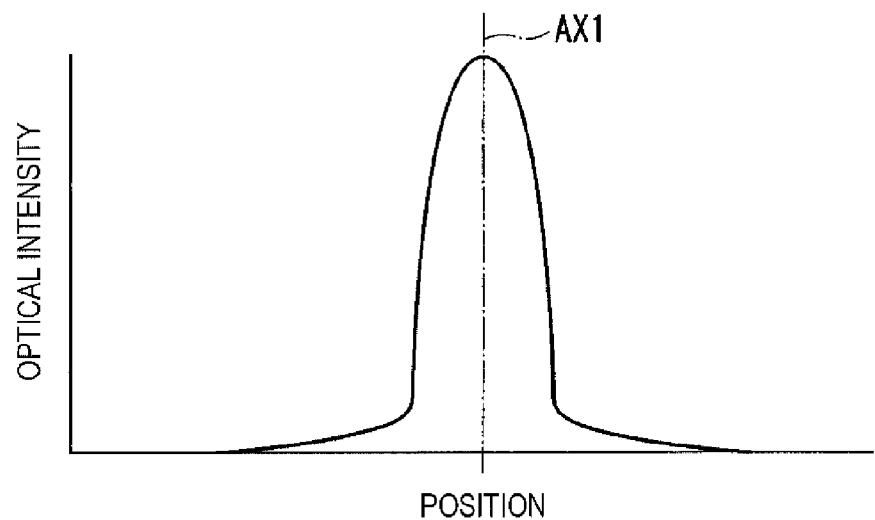
FIG. 2 shows the optical intensity distribution of diffused light.

FIG. 2 shows the optical intensity distribution of the diffused light.

Figure 3:
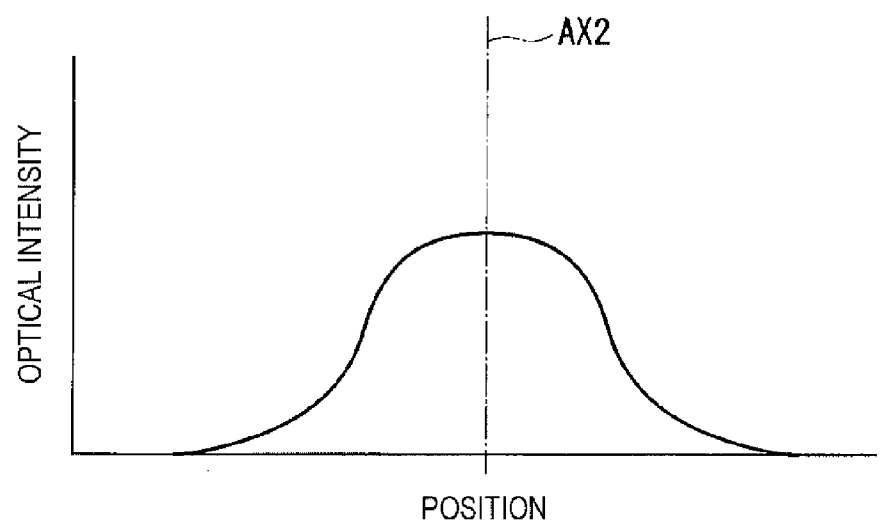
FIG. 3 shows the optical intensity distribution of fluorescence.

FIG. 3 shows the optical intensity distribution of the fluorescence.

In FIG. 2, the horizontal axis represents the position where the diffused light is outputted with respect to the center that is the optical axis AX1 of the diffused light (The output position is simply described as POSITION in FIG. 2). The vertical axis represents the optical intensity of the diffused light.

In FIG. 3, the horizontal axis represents the position where the fluorescence is emitted with respect to the center that is the optical axis AX2 of the fluorescence (The emission position is simply described as POSITION in FIG. 3).

The optical intensity distributions of the diffused light and the fluorescence greatly differ from each other, as shown in FIGS. 2 and 3. Specifically, the maximum of the optical intensity (peak intensity) of the diffused light is greater than the maximum of the optical intensity (peak intensity) of the fluorescence. The full width at half maximum of the optical intensity distribution of the fluorescence is greater than the full width at half maximum of the optical intensity distribution of the diffused light.

A conceivable reason for this is as follows.

The diffused light from the diffuser member 41 is a result of diffusion of highly directive light outputted from the solid-state light source 21. The diffused light therefore has directivity left therein to some extent.

On the other hand, the fluorescence is emitted from the phosphor 42 excited by the light outputted from the excitation light source 22. The fluorescence has a characteristic of isotropically spreading in radial directions irrespective of the presence or absence of directivity of the light incident on the phosphor 42.

Before describing the configuration of the light blocking members according to the present embodiment, the configuration of a light blocking member according to a comparable example will be described with reference to FIG. 4.

Figure 4:
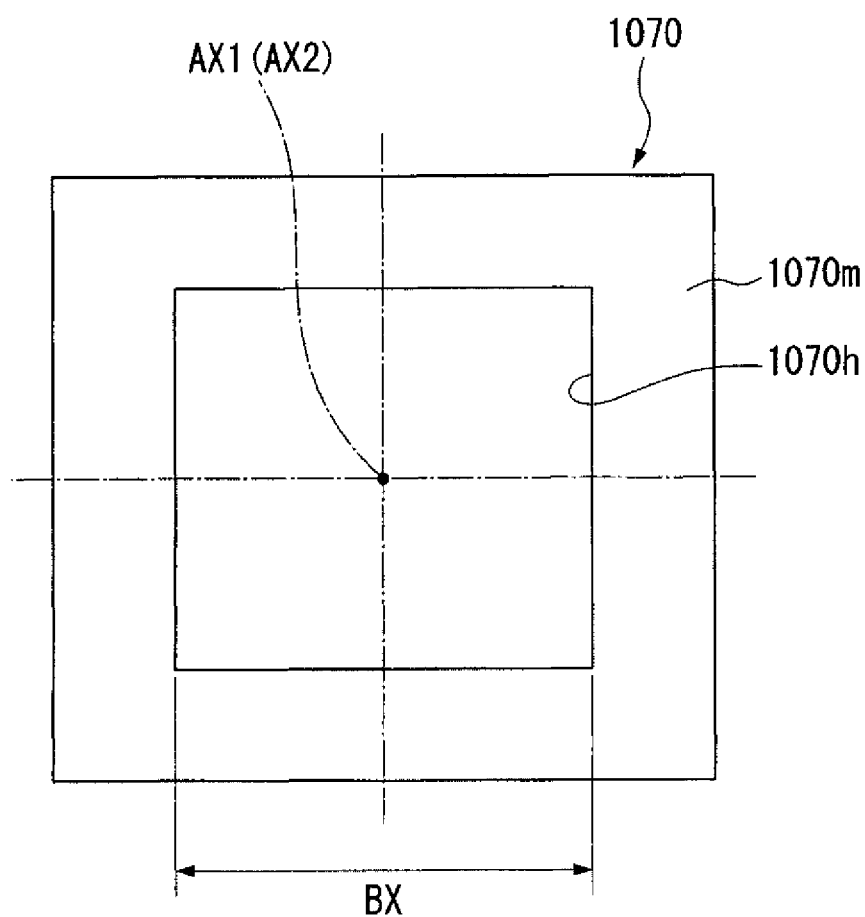
FIG. 4 is a plan view of a light blocking member according to a comparative example.

FIG. 4 is a plan view of a light blocking member 1070 according to the comparative example.

The light blocking member 1070 is disposed both in the optical path between the diffuser member and the light modulators (in the optical path between the pair of first lens arrays, for example) and in the optical path between the phosphor and the light modulators (in the optical path between the pair of second lens arrays, for example).

The light blocking member 1070 has a light blacker 1070$m$ and an opening 1070$h$, which is formed around the optical axis AX1 of the diffused light (optical axis AX2 of fluorescence), as shown in FIG. 4. The light blocker 1070$m$ has a rectangular frame-like shape in a plan view. The opening 1070$h$ has a rectangular shape in a plan view. In FIG. 4, reference character BX denotes the area of the opening 1070$h$ (opening area). The opening 1070$h$ is centered at the optical axis AX1 (optical axis AX2).

From the viewpoint of maintaining the white balance of a projected image, the amount of diffused light (amount of blue light, for example) and the amount of fluorescence (amount of red light and green light, for example) incident on the light modulators are each set at a predetermined value.

The effect of the light blocking member 1070 according to the comparative example will be described below with reference to FIGS. 5 and 6.

Figure 5:
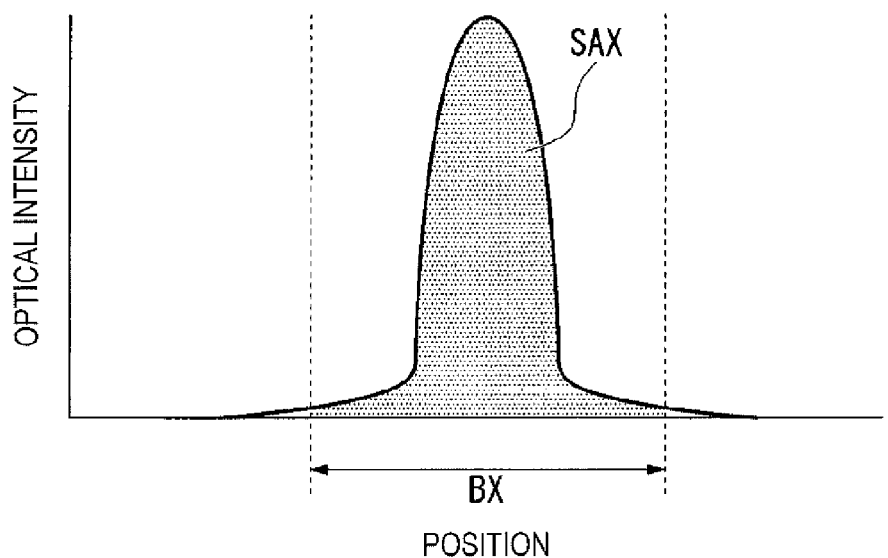
FIG. 5 describes diffused light having undergone light blocking in accordance with the comparative example.

FIG. 5 describes diffused light having undergone light blocking in accordance with the comparative example.

Figure 6:
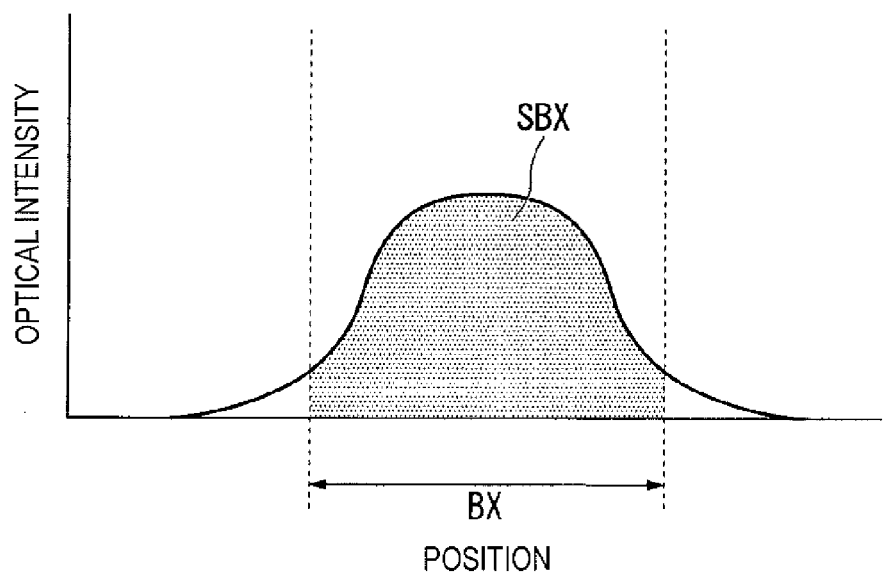
FIG. 6 describes fluorescence having undergone light blocking in accordance with the comparative example.

FIG. 6 describes fluorescence having undergone light blocking in accordance with the comparative example.

Two broken lines perpendicular to the horizontal axis in FIGS. 5 and 6 correspond to the contour of the opening 1070$h$ (opening area BX) (boundary line between opening 1070$h$ and light blocker 1070$m$ shown in FIG. 4).

In the comparative example, the amount of light blocked by the light blocking member 1070 greatly differs between the diffused light and the fluorescence from the reason described above, as shown in FIGS. 5 and 6. Specifically, the amount of diffused light blocked by the light blocking member 1070 in the optical path of the diffused light is smaller than the amount of fluorescence blocked by the light blocking member 1070 in the optical path of the fluorescence. In other words, the amount of diffused light SAX that passes through the opening 1070$h$ of the light blocking member 1070 in the optical path of the diffused light is greater than the amount of fluorescence SBX that passes through the opening 1070$h$ of the light blocking member 1070 in the optical path of the fluorescence.

Therefore, when the same light blocking member 1070 according to the comparative example is disposed in each of the optical paths described above, the amount of diffused light incident on the corresponding light modulator is greater than a predetermined value, whereas the amount of fluorescence incident on each of the corresponding light modulators is less than a predetermined value.

The present inventor has conducted a study and found that the configuration described above causes the white balance of a projected image to deteriorate (when the diffused light is blue light and the fluorescence is yellow light, a projected image becomes bluish, for example).

To solve the problem described above, in the present embodiment, the ratio of a first light blocking area A2 to a first opening area A1 of the first light blocking member 71 or A2/A1 is set to be greater than the ratio of a second light blocking area B2 to a second opening area B1 of the second light blocking member 72 or B2/B1.

The first opening area A1 is the area of an opening 71h of the first light blocking member 71 viewed in the direction of the optical axis AX1 of the diffused light. The first light blocking area A2 is the area, viewed in the direction of the optical axis AX1 of the diffused light, of a portion over which the first light blocking member 71 blocks the diffused light. The second opening area B1 is the area of an opening 72h of the second light blocking member 72 viewed in the direction of the optical axis AX2 of the fluorescence. The second light blocking area B2 is the area, viewed in the direction of the optical axis AX2 of the fluorescence, of a portion over which the second light blocking member 72 blocks the fluorescence.

The first light blocking member and the second light blocking member will be described below in detail with reference to FIGS. 7 and 8.

Figure 7:
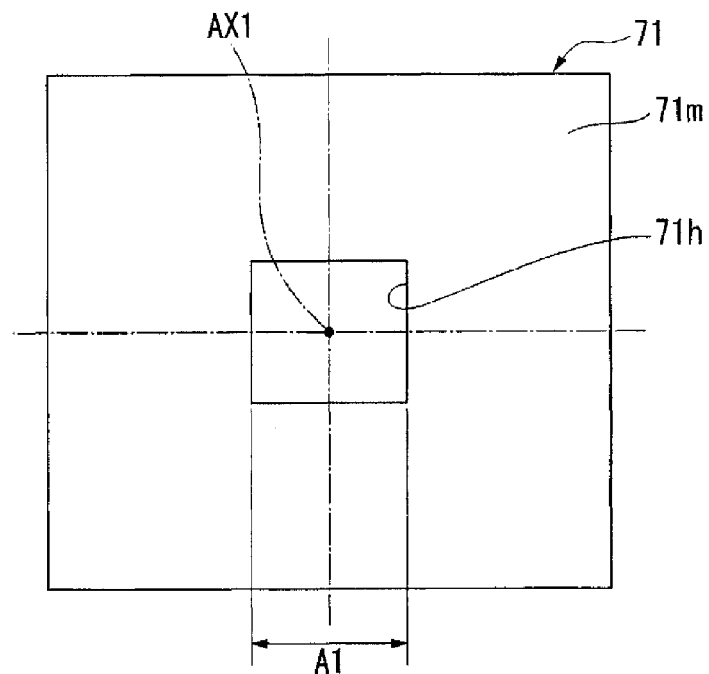
FIG. 7 is a plan view of a first light blocking member according to the present embodiment.

FIG. 7 is a plan view of the first light blocking member 71 according to the present embodiment.

Figure 8:
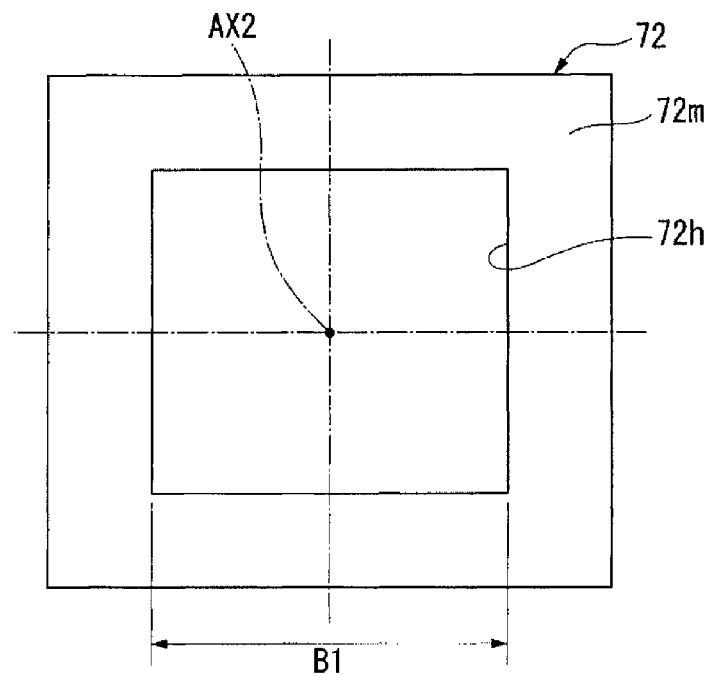
FIG. 8 is a plan view of a second light blocking member according to the present embodiment.

FIG. 8 is a plan view of the second light blocking member 72 according to the present embodiment.

The first light blocking member 71 is disposed in the optical path between the diffuser member 41 and the liquid crystal light modulator 400B, specifically, in the optical path between the pair of first lens arrays 121 and 131, as described above. On the other hand, the second light blocking member 72 is disposed in the optical path between the phosphor 42 and the light modulation unit 400, specifically, in the optical path between the pair of second lens arrays 122 and 132.

The first light blocking member 71 has a light blocker 71m and the opening 71h, which is centered at the optical axis AX1 of the diffused light, as shown in FIG. 7. The light blocker 71m has a rectangular frame-like shape in a plan view. The opening 71h has a rectangular shape in a plan view. In FIG. 7, reference character A1 denotes the area of the opening 71h (first opening area).

The second light blocking member 72 has a light blocker 72m and the opening 72h, which is centered at the optical axis AX2 of the fluorescence, as shown in FIG. 8. The light blacker 72m has a rectangular frame-like shape in a plan view. The opening 72h has a rectangular shape in a plan view. In FIG. 8, reference character 31 denotes the area of the opening 72h (second opening area).

The first opening area A1 of the opening 71h of the first light blocking member 71 is smaller than the second opening area B1 of the opening 72h of the second light blocking member 72, as shown in FIGS. 7 and 8.

A description will next be made of the relationship between the opening area and the light blocking area of each of the first light blocking member and the second light blocking member with reference to FIGS. 9 and 10.

Figure 9:
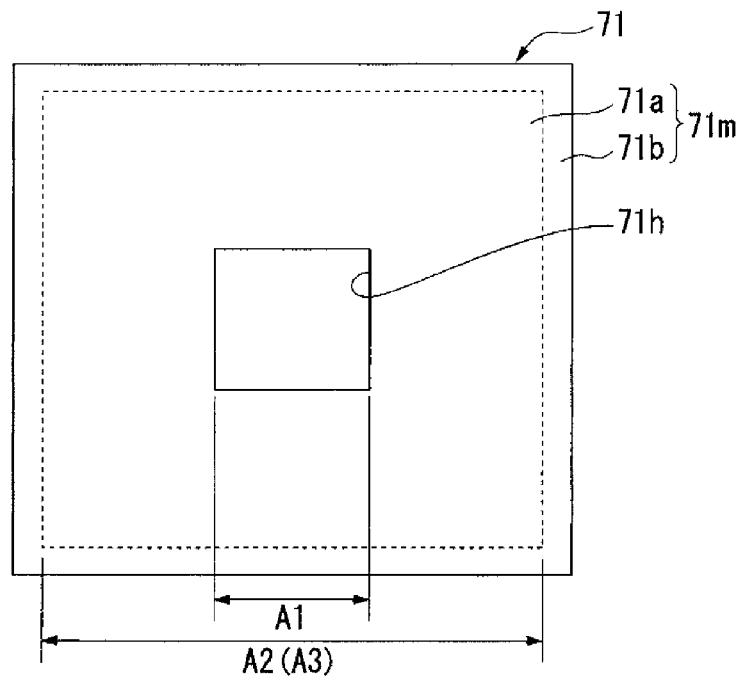
FIG. 9 describes a first opening area and a first light blocking area.

FIG. 9 describes the first opening area A1 and the first light blocking area A2 of the first light blocking member 71.

Figure 10:
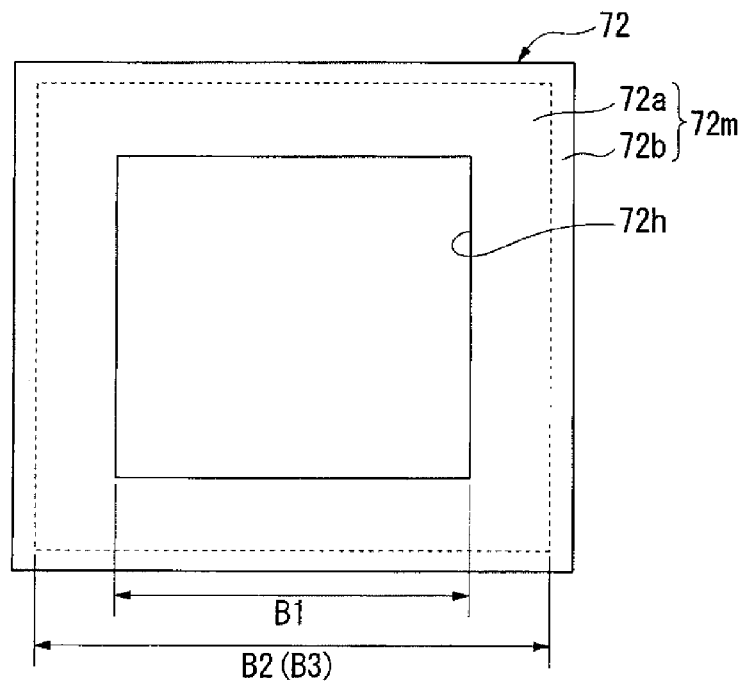
FIG. 10 describes a second opening area and a second light blocking area.

FIG. 10 describes the second opening area B1 and the second light blocking area B2 of the second light blocking member 72.

When a light blocking member is disposed in a predetermined optical path, the size of the outer edge of a light blocker is set to be greater than the light flux width of light incident on the light blocker from the viewpoint of suppressing light leakage and stray light.

The light blocker 71m of the first light blocking member 71 has a first light blocker 71a and a second light blocker 71b, as shown in FIG. 9. The first light blacker 71a is the portion of the light blocker 71m on which the diffused light is actually incident (the portion of the light blocker 71m that actually blocks diffused light). The second light blocker 71b is the portion of the light blocker 71m on which no diffused light is actually incident (the portion of the light blocker 71m that actually blocks no diffused light).

The first light blocker 71a corresponds to the "portion of the first light blocking member that blocks diffused light" described in the appended claims. The area A2 of the first light blocker 71a corresponds to the "first light blocking area A2" described in the appended claims.

The first light blocker 71a will be described with reference to FIG. 11.

Figure 11:
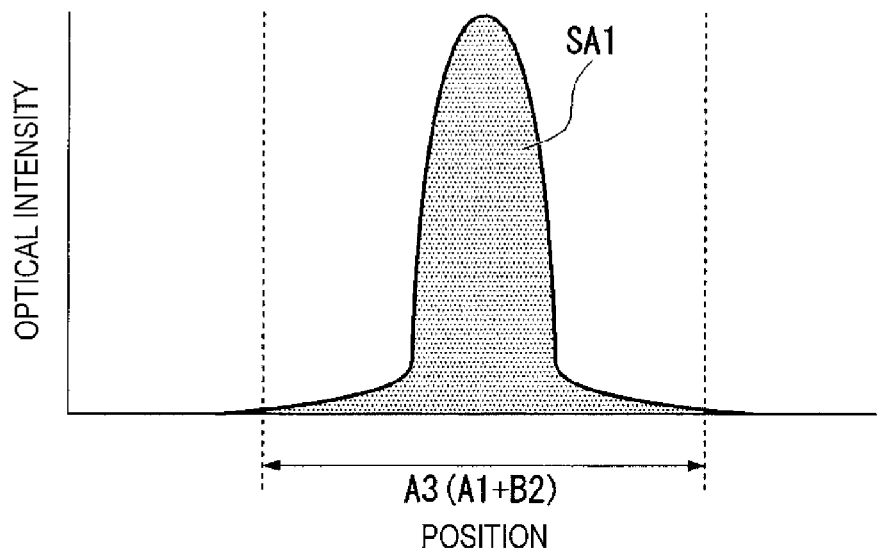
FIG. 11 describes the relationship between the optical intensity distribution of the diffused light and the first light blocking area.

FIG. 11 describes the relationship between the optical intensity distribution of the diffused light and the first light blocking area A2. In FIG. 11, two broken lines perpendicular to the horizontal axis correspond to the counter (boundary line between first light blocker 71a and second light blocker 71b shown in FIG. 9) of a portion having the combined first opening area A1 and first light blocking area A2 (area A3 of the portion).

The amount of light incident on the first light blocking member 71 is, for example, set at the amount that is obtained by subtracting the amount of the portion of low optical intensity from the amount of diffused light that travels along the optical path between the pair of first lens arrays 121 and 131, as shown in FIG. 11. Specifically, the amount of light incident on the opening 71h and the first light blocker 71a of the first light blocking member 71 is set at an amount of light SA1, which is 99% of the total amount of diffused light that travels along the optical path between the pair of first lens arrays 121 and 131.

The light blocker 72m of the second light blocking member 72 has a first light blocker 72a and a second light blocker 72b, as shown in FIG. 10. The first light blocker 72a is the portion of the light blocker 72m on which the fluorescence is actually incident (the portion of the light blocker 72m that actually blocks fluorescence). The second light blocker 72b is the portion of the light blocker 72m on which no fluorescence is actually incident (the portion of light blocker 72m that actually blocks no fluorescence).

The first light blocker 72a corresponds to the "portion of the second light blocker that blocks fluorescence" described in the appended claims. The area B2 of the first light blocker 72a corresponds to the "second light blocking area B2" described in the appended claims.

The first light blocker 72a will be described with reference to FIG. 12.

Figure 12:
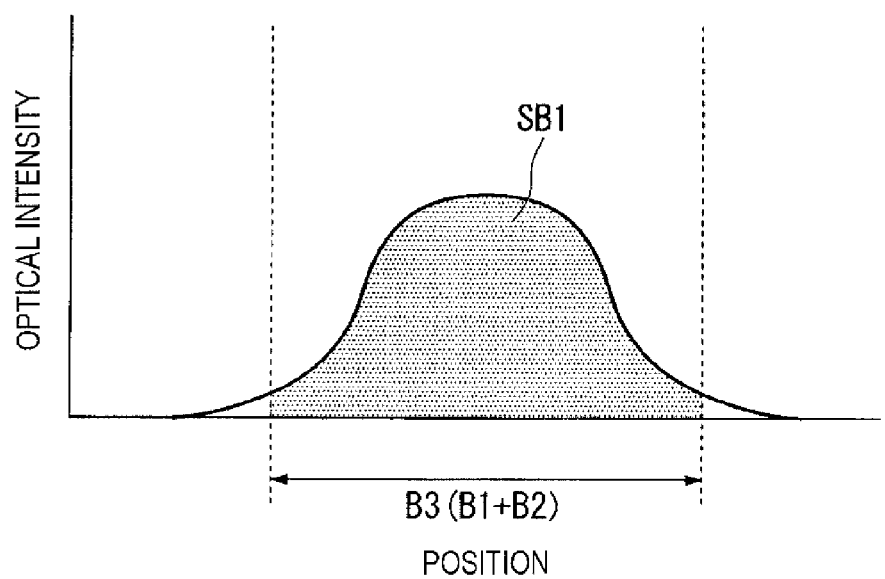
FIG. 12 describes the relationship between the optical intensity distribution of the fluorescence and the second light blocking area.

FIG. 12 describes the relationship between the optical intensity distribution of the fluorescence and the second light blocking area. In FIG. 12, two broken lines perpendicular to the horizontal axis correspond to the counter (boundary line between first light blocker 72a and second light blocker 72b shown in FIG. 10) of a portion having the combined second opening area B1 and second light blocking area B2 (area B3 of the portion).

The amount of light incident on the second light blocking member 72 is, for example, set at the amount that is obtained by subtracting the amount of the portion of low optical intensity from the amount of fluorescence that travels along the optical path between the pair of second lens arrays 122 and 132, as shown in FIG. 12. Specifically, the amount of light incident on the opening 72h and the first light blocker 72a of the second light blocking member 72 is set at an amount of light SB1, which is 99% of the total amount of fluorescence that travels along the optical path between the pair of second lens arrays 122 and 132.

In the present embodiment, the ratio A2/A1 of the first light blocking area A2 to the first opening area A1 of the first light blocking member 71 is greater than the ratio B2/B1 of the second light blocking area B2 to the second opening area B1 of the second light blocking member 72, as shown in FIGS. 9 and 10.

The effect of the light blocking members according to the present embodiment will be described below with reference to FIGS. 13 and 14.

Figure 13:
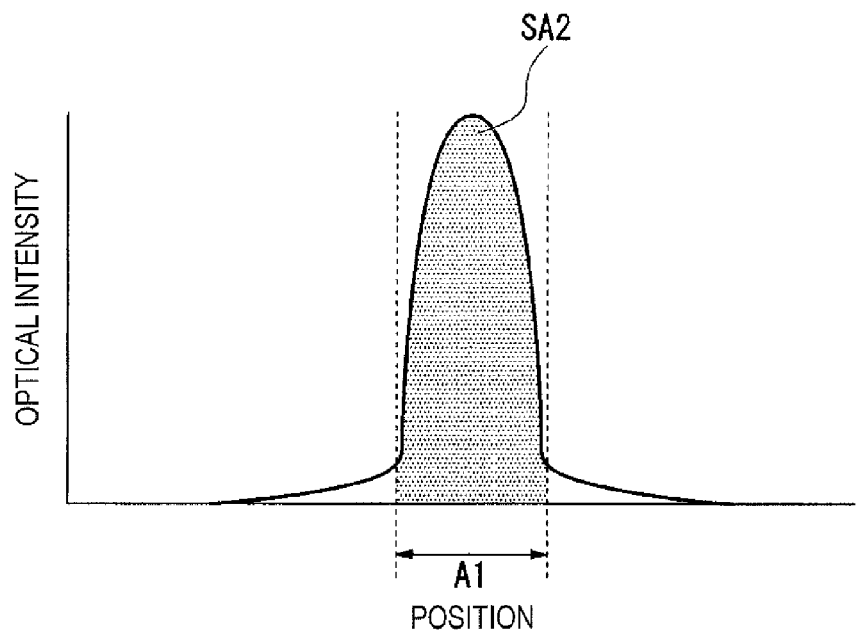
FIG. 13 describes diffused light having undergone light blocking in accordance with the present embodiment.

FIG. 13 describes diffused light having undergone light blocking in accordance with the present embodiment.

Figure 14:
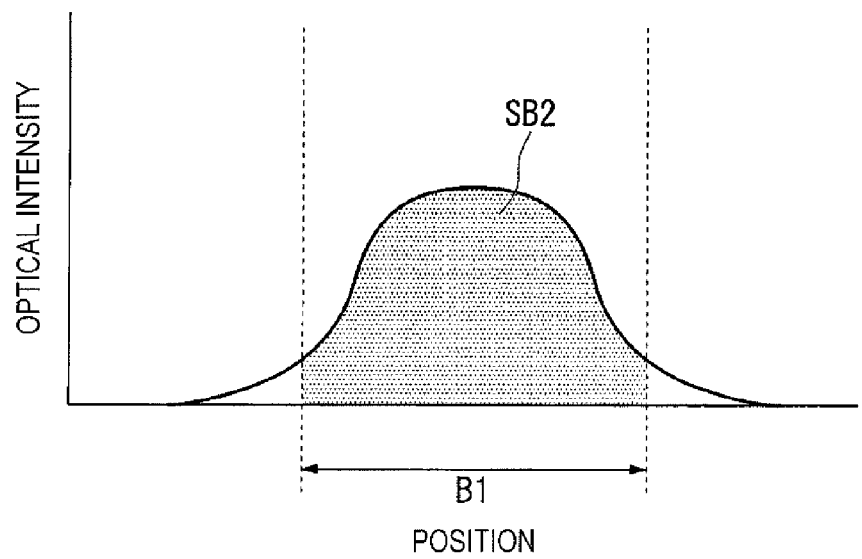
FIG. 14 describes fluorescence having undergone light blocking in accordance with the present embodiment.

FIG. 14 describes fluorescence having undergone light blocking in accordance with the present embodiment.

In FIG. 13, two broken lines perpendicular to the horizontal axis correspond to the counter (boundary line between opening 71h and first light blocker 71a of light blocker 71m shown in FIG. 9) of the opening 71h (first opening area A1). In FIG. 14, two broken lines perpendicular to the horizontal axis correspond to the counter (boundary line between opening 72h and first light blocker 72a of light blocker 72m shown in FIG. 10) of the opening 72h (second opening area B1).

In the comparative example, in which the same light blocking member 1070 is used in the optical path of each of the diffused light and the fluorescence, the amount of diffused light SAX passing through the opening 1070h of the light blocking member 1070 in the optical path of the diffused light is greater than the amount of fluorescence SBX passing through the opening 1070h of the light blocking member 1070 in the optical path of the fluorescence, as shown in FIGS. 5 and 6. As a result, the white balance of a projected light undesirably deteriorates.

In contrast, in the present embodiment, in which the ratio A2/A1 of the first light blocking area A2 to the first opening area A1 of the first light blocking member 71 is greater than the ratio B2/B1 of the second light blocking area B2 to the second opening area B1 of the second light blocking member 72, a blocked skirt portion of the optical intensity distribution of the diffused light (portion where optical intensity is low) can be greater than a blocked skirt portion of the optical intensity distribution of the fluorescence (portion where optical intensity is low), as shown in FIGS. 13 and 14. Setting the ratio A2/A1 of the first light blocking area A2 to the first opening area A1 or the ratio B2/B1 of the second light blocking area B2 to the second opening area B1 at a predetermined value therefore allows the amount of diffused light SA2 passing through the opening 71h of the first light blocking member 71 in the optical path of the diffused light and the amount of fluorescence S32 passing through the opening 72h of the second light blocking member 72 in the optical path of the fluorescence to be equal to each other, whereby the amount of diffused light (blue light LB) incident on the liquid crystal light modulator 400B and the amount of fluorescence incident on the liquid crystal light modulators 400R and 400G (red light LR incident on liquid crystal light modulator 400R and green light LG incident on liquid crystal light modulator 400G) can be equal to each other. The white balance of a projected image can thus be maintained.

Further, in the present embodiment, the first light blocking member 71 is disposed in the optical path between the pair of first lens arrays 121 and 131.

The optical intensity distribution of the diffused light varies depending on the position in the optical path between the diffuser member 41 and the liquid crystal light modulator 400B.

If the first light blocking member 71 is disposed in the optical path between the first polarization conversion element 141 and the liquid crystal light modulator 400B, the optical intensity distribution of the diffused light at the first light blocking member 71 may greatly differ from an initial distribution in some cases. In this case, it is difficult to effectively block the diffused light.

In contrast, when the first light blocking member 71 is disposed in the optical path between the pair of first lens arrays 121 and 131, the position where the first light blocking member 71 is disposed is closer to the diffuser member 41 than in the configuration in which the first light blocking member 71 is disposed in the optical path between the first polarization conversion element 141 and the liquid crystal light modulator 400B. As a result, the difference between the optical intensity distribution of the diffused light at the first light blocking member 71 and the initial distribution can be reduced.

According to the configuration described above, the diffused light is therefore readily and effectively blocked.

Further, in the present embodiment, the second light blocking member 72 is disposed in the optical path between the pair of second lens arrays 122 and 132.

The optical intensity distribution of the fluorescence varies depending on the position in the optical path between the phosphor 42 and the light modulation unit 400.

If the second light blocking member 72 is disposed in the optical path between the second polarization conversion element 142 and the light modulation unit 400, the optical intensity distribution of the fluorescence at the second light blocking member 72 may greatly differ from an initial distribution in some cases. In this case, it is difficult to effectively block the fluorescence.

In contrast, when the second light blocking member 72 is disposed in the optical path between the pair of second lens arrays 122 and 132, the position where the second light blocking member 72 is disposed is closer to the phosphor 42 than in the configuration in which the second light blocking member 72 is disposed in the optical path between the second polarization conversion element 142 and the light modulation unit 400. As a result, the difference between the optical intensity distribution of the fluorescence at the second light blocking member 72 and the initial distribution can be reduced.

According to the configuration described above, the fluorescence is therefore readily and effectively blocked.

The first light blocking member 71 may be so configured that the ratio A2/A1 of the first light blocking area A2 to the first opening area A1 is adjustable in correspondence with the optical intensity distribution of the light outputted from the solid-state light source 21.

The configuration described above allows the amount of diffused light (blue light LB) incident on the liquid crystal light modulator 400B to be adjusted to a predetermined value even when the optical intensity distribution of the diffused light has a broad or narrow skirt portion (portion where optical intensity is low). The amount of diffused light (blue light LB) incident on the liquid crystal light modulator 400B and the amount of fluorescence incident on the liquid crystal light modulators 400R and 400G (red light LR incident on liquid crystal light modulator 400R and green light LG incident on liquid crystal light modulator 400G) can therefore be readily made equal to each other.

Examples of the configuration that can adjust the ratio A2/A1 may be a mechanical shutter or an electronically controlled shutter (electronic shutter).

Further, the second light blocking member 72 may be so configured that the ratio B2/B1 of the second light blocking area B2 to the second opening area B1 is adjustable in correspondence with the optical intensity distribution of the light outputted from the excitation light source 22.

The configuration described above allows the amount of fluorescence incident on the liquid crystal light modulators 400R and 400G to be adjusted to a predetermined value even when the optical intensity distribution of the fluorescence has a broad or narrow skirt portion (portion where optical intensity is low). The amount of diffused light (blue light LE) incident on the liquid crystal light modulator 400B and the amount of fluorescence incident on the liquid crystal light modulators 400R and 400G (red light LR incident on liquid crystal light modulator 400R and green light LG incident on liquid crystal light modulator 400G) can therefore be readily made equal to each other.

Examples of the configuration that can adjust the ratio B2/B1 may be a mechanical shutter or an electronically controlled shutter (electronic shutter).

Further, the first light blocking member 71 may be so configured that the ratio A2/A1 of the first light blocking area A2 to the first opening area A1 is adjustable in correspondence with the luminance or contrast of a projected image projected through the projection system 600.

The amount of diffused light incident on the liquid crystal light modulator 400B can therefore be adjusted as appropriate in accordance, for example, with a purpose of increasing the luminance or contrast of a projected image. The luminance or contrast of the projected image can therefore be readily increased.

Further, the second light blocking member 72 may be so configured that the ratio B2/B1 of the second light blocking area B2 to the second opening area B1 is adjustable in correspondence with the luminance or contrast of a projected image projected through the projection system 600.

The amount of fluorescence incident on the liquid crystal light modulators 400R and 400G can therefore be adjusted as appropriate in accordance, for example, with a purpose of increasing the luminance or contrast of a projected image. The luminance or contrast of the projected image can therefore be readily increased.

The present embodiment has been described with reference to the case where the first light blocking member 71 is disposed in the optical path between the pair of first lens arrays 121 and 131, but the position of the first light blocking member 71 is not limited thereto. For example, the first light blocking member 71 may be disposed in the optical path between the rear lens array 131 and the first polarization conversion element 141. The arrangement described above also readily allows effective blocking of the diffused light.

Further, the first light blocking member 71 may be disposed in the optical path between the first polarization conversion element 141 and the liquid crystal light modulator 400B. The arrangements described before are, however, preferable from the viewpoint of readily performing effective blocking of the diffused light.

Further, the present embodiment has been described with reference to the case where the second light blocking member 72 is disposed in the optical path between the pair of second lens arrays 122 and 132, but the position of the second light blocking member 72 is not limited thereto. For example, the second light blocking member 72 may be disposed in the optical path between the rear lens array 132 and the second polarization conversion element 142. The arrangement described above also readily allows effective blocking of the fluorescence.

Further, the second light blocking member 72 may be disposed in the optical path between the second polarization conversion element 142 and the light modulation unit 400. The arrangements described before are, however, preferable from the viewpoint of readily performing effective blocking of the fluorescence.

Further, the present embodiment has been described with reference to the case where the solid-state light source 21 is a solid-state light source that outputs blue light; the excitation light source 22 is an excitation light source that outputs blue light; and the phosphor 42 is a phosphor that emits yellow light when excited by blue light, but the light sources and the phosphor are not limited thereto.

For example, the solid-state light source may include a first solid-state light source that outputs blue light and a second solid-state light source that outputs red light, the excitation light source may be an excitation light source that outputs blue light, and the phosphor may be a phosphor that emits green light when excited by blue light.

Further, the present embodiment has been described with reference to the case where the light blocker 71m of the first light blocking member 71 has a rectangular frame-like shape in a plan view; the opening 71h has a rectangular shape in a plan view; the light blocker 72m of the second light blocking member 72 has a rectangular frame-like shape in a plan view; and the opening 72h has a rectangular shape in a plan view, but the shapes of the light blockers and openings are not limited thereto. For example, each of the light blockers may have a ring-like shape, and each of the openings may have a circular or elliptical shape. Each of the light blockers and the openings may have a variety of other shapes in a plan view as appropriate.

Moreover, the present embodiment has been described with reference to the case where the amount of diffused light SA2 passing through the opening 71h of the first light blocking member 71 in the optical path of the diffused light is made equal to the amount of fluorescence SB2 passing through the opening 72h of the second light blocking member 72 in the optical path of the fluorescence by setting the ratio A2/A1 of the first light blocking area A2 to the first opening area A1 or the ratio B2/B1 of the second light blocking area B2 to the second opening area B1 at a predetermined value, but the ratios are not necessarily set this way. For example, the ratio A2/A1 can be set at a value greater than the ratio B2/B1 in such a way that the difference between the amount of diffused light SA2 and the amount of fluorescence SB2 decreases to the extent that the liquid crystal light modulators 400R, 400G, and 400B can adjust the white balance.

The projector according to the embodiment described above is a transmission-type projector, but the projector is not limited thereto but may, for example, be a reflection-type projector. The term "transmission-type" used herein means that the light modulation device is of light-transmission type, such as a transmissive liquid crystal device, and the term "reflection-type" used herein means that the light modulation device is of light-reflection type, such as a reflective liquid crystal device. When the invention is applied to a reflection-type projector, the same advantageous effect as that provided by a transmission-type projector can also be provided.

In the projector according to the embodiment described above, a liquid crystal light modulator is used as the light modulator, but the invention is not necessarily configured this way. In general, the light modulator may be any other device that modulates light incident thereon in accordance with image information, such as a micromirror light modulation device. For example, a DMD (digital micromirror device: a trademark of Texas Instruments) can be used as the micromirror light modulation device.

The invention is applicable to not only a front projection projector that performs projection from the side where a projected image is observed but also a rear projection projector that performs projection from the side opposite to the side where a projected image is observed.

A preferable embodiment according to the invention has been described with reference to the drawings, but the invention is, of course, not limited to the embodiment described above. The shapes, combinations, and other features of the constitutive members shown in the embodiment described above are presented by way of example and can be changed in a variety of ways based on design requirements and other factors to the extent that the changes do not depart from the substance of the invention.

In addition to the above, the specific description of the shape, the number, the arrangement, the material, the formation method, and other attributes of the constitutive elements of the projector are not limited to those in the embodiment described above and can be changed as appropriate.

The entire disclosure of Japanese Patent Application No. 2012-260961, filed on Nov. 29, 2012 is expressly incorporated by reference herein.

What is claimed is:

1. A projector comprising:
a solid-state light source;
a diffuser member that diffuses light outputted from the solid-state light source and outputs the diffused light;
an excitation light source;
a phosphor that is excited by light outputted from the excitation light source and emits fluorescence;
a light modulator that modulates the diffused light outputted from the diffuser member and the fluorescence emitted from the phosphor in accordance with image information;
a projection system that projects the light modulated by the light modulator as a projected image;
a first light blocking member that is disposed in an optical path between the diffuser member and the light modulator and has an opening formed around the optical axis of the diffused light; and
a second light blocking member that is disposed in an optical path between the phosphor and the light modulator and has an opening formed around the optical axis of the fluorescence,
wherein when an area of the opening of the first light blocking member viewed in the direction of the optical axis of the diffused light is defined as a first opening area A1; an area, viewed in the direction of the optical axis of the diffused light, of a portion over which the first light blocking member blocks the diffused light is defined as a first light blocking area A2; an area of the opening of the second light blocking member viewed in the direction of the optical axis of the fluorescence is defined as a second opening area B1; and an area, viewed in the direction of the optical axis of the fluorescence, of a portion over which the second light blocking member blocks the fluorescence is defined as a second light blocking area B2,
the ratio A2/A1 of the first light blocking area A2 to the first opening area A1 is greater than the ratio B2/B1 of the second light blocking area B2 to the second opening area B1.

2. The projector according to claim 1,
wherein the first light blocking member is so configured that the ratio A2/A1 is adjustable in correspondence with the optical intensity distribution of the light outputted from the solid-state light source.

3. The projector according to claim 1,
wherein the second light blocking member is so configured that the ratio B2/B1 is adjustable in correspondence with the optical intensity distribution of the light outputted from the excitation light source.

4. The projector according to claim 1,
wherein the first light blocking member is so configured that the ratio A2/A1 is adjustable in correspondence with the luminance or contrast of the projected image projected through the projection system.

5. The projector according to claim 1,
wherein the second light blocking member is so configured that the ratio B2/B1 is adjustable in correspondence with the luminance or contrast of the projected image projected through the projection system.

6. The projector according to claim 1,
wherein a first collimation system that parallelizes the diffused light outputted from the diffuser member, a pair of first lens arrays that homogenizes the luminance distribution of the light outputted from the first collimation system, and a first polarization conversion element that aligns the polarization states of the light outputted from the pair of first lens arrays are disposed in the optical path between the diffuser member and the light modulator, and
the first light blocking member is disposed in the optical path between the pair of first lens arrays or in the optical path between the pair of first lens arrays and the first polarization conversion element.

7. The projector according to claim 1,
wherein a second collimation system that parallelizes the fluorescence emitted from the phosphor, a pair of second lens arrays that homogenizes the luminance distribution of the light outputted from the second collimation system, and a second polarization conversion element that aligns the polarization states of the light outputted from the pair of second lens arrays are disposed in the optical path between the phosphor and the light modulator, and
the second light blocking member is disposed in the optical path between the pair of second lens arrays or in the optical path between the pair of second lens arrays and the second polarization conversion element.

* * * * *